Dec. 17, 1935. A. S. BOSMA 2,024,677
AUTOMATIC FRICTION CLUTCH
Original Filed Sept. 14, 1932

Inventor:

Alfred S. Bosma

Patented Dec. 17, 1935

2,024,677

UNITED STATES PATENT OFFICE 2,024,677

AUTOMATIC FRICTION CLUTCH

Alfred S. Bosma, New Holstein, Wis., assignor to F. H. Edson and C. O. Piper, receivers of The Lauson Corporation Refiling of application Serial No. 633,036, September 14, 1932. This application July 15, 1935, Serial No. 31,413

1 Claim. (Cl. 192—105)

This invention appertains to a novel device for transmitting power from a driving member to a driven member, so that the load can be gradually assumed by the driving member without undue strain thereon.

One of the primary objects of my invention is to provide an automatic clutch between the drive and driven members, whereby when the driving member reaches a predetermined speed, the drive will be transferred to the driven member, the clutch being of such a character as to allow the prime mover to accelerate substantially to its normal speed without load and then to gradually pick up the load, thereby eliminating the difficulties contingent in assuming a load requiring a large starting torque.

Another prime object of my invention is to provide an automatic clutch having friction shoes connected with the drive member for cooperation with a friction drum connected with the driven member, the friction shoes being adapted to be moved into engagement with the drum by centrifugal force after the driving member reaches a predetermined speed.

A further object of my invention is the provision of a novel automatic clutch embodying friction shoes connected with the driving member and adapted to be moved into engagement with a friction drum carried by the driven member after the driving member assumes a predetermined speed, the shoes being connected with the driving member by means of novelly arranged toggle links, so that the toggle links will be straightened out after the engagement of the shoes with the drum for effectively holding the shoes in tight contact with the drum.

A still further object of my invention is to provide an automatic friction clutch of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which:

Figure 1 is a front elevation of my improved clutch with the cover plate removed to illustrate the interior construction thereof.

Figure 2 is a diametric section through the clutch taken on the line 2—2 of Figure 1.

Referring to the drawing in detail, wherein similar reference characters designate the corresponding parts throughout the several views, the letter A generally indicates my improved clutch, which comprises a hollow driving hub or sleeve 1, which is adapted to be keyed or otherwise secured to the driving shaft of a prime mover, which can be either of an engine of the internal combustion type or an electric motor.

Rotatably mounted upon the hub or sleeve 1 is the driven member 2, which can be of any desired character or type, such as a sprocket, gear, or a pulley, as shown. Formed on one side of the pulley 2 is a drum 7 which surrounds the hub in spaced relation thereto. As shown, a suitable bearing brass or bushing 8 can be enclosed between the pulley or other driven member and the drive hub or sleeve 1.

Formed on the opposite sides of the hub or sleeve 1 are radially extending lugs 9, which are normally disposed at one side of lugs 10 formed on the inner faces of the diametrically disposed arcuate friction shoes 4. The lugs 9 and 10 are connected together by links 3. Suitable pivot pins 11 connect the ends of the links 3 with the lugs 9 and 10. The links in connection with the lugs form a toggle joint, for a purpose which will be later set forth.

Connected with the ends of the arcuate friction shoes 4 are inwardly directed tubular guide sleeves 12, which receive the guide rods 13. These friction shoes 4 are normally urged toward one another and away from the friction drum 7 by means of contractile coil springs 5. The ends of the springs 5 are anchored as at 6 to lugs or ears 14 on or secured to the guide sleeve 12. A cover plate 15 is provided for the open side of the drum, and this cover plate can be in the nature of a circular disc having a hub 16, which is secured to the tubular drive member or hub sleeve 1 by means of a set screw or similar locking device 17.

In operation of my improved clutch, the hub sleeve is rotated directly from the drive shaft of the motor or engine, and the friction shoes 4 are carried therewith, the friction drum 7 and the pulley 2 remaining at rest. When the turning speed of the hub sleeve 1 is increased sufficiently to cause the centrifugal force on the shoes 4 to overcome the tension of the springs 5, the shoes come into frictional contact with the inner face of the drum 7, causing said drum and driven member of pulley 2 to revolve at a gradually increased turning speed.

As the friction shoes 4 come into contact with the slower rotating friction drum 7, a load is applied against the friction shoes 4, which tends to retard the rotation of the same, and causes the straightening of the toggle links 3. This forces the shoes 4 outward against the inner face of the friction drum 7, forming a positive lock and preventing any further slippage between the clutch parts.

By this arrangement it is obvious that the motor or engine is allowed to accelerate substantially to its normal running speed entirely free of the load, and that the load will then be assumed by the motor or engine as the friction clutch takes hold.

The tension of the springs 5 can be adjusted so as to cause the clutch to grip tightly at any reasonable predetermined speed. When the speed of the drive member decreases, the springs 5 will pull the clutch shoes from out of engagement with the friction drum, and thus relieve the motor or engine of the load.

In substance, this application is the same as my abandoned application, Serial No. 633,036, filed September 14, 1932.

Changes in details may be made without departing from the spirit or the scope of the invention, but what I claim as new is:

A friction clutch for automatically connecting a drive and a driven member together, comprising a tubular drive shaft, a driven power transmitting device freely rotatable on the tubular shaft, a drum formed on one side of the power transmitting device, a pair of oppositely disposed friction drive shoes mounted within the drum on opposite sides of the tubular drive shaft, inwardly directed guide sleeves formed on the friction shoes, guide rods received within the sleeves, laterally projecting ears formed on the guide sleeves, contractile coil springs connecting the ears of the opposed shoes together, facing lugs on the shoes and shaft normally disposed out of alinement, and links pivotally connecting the last mentioned lugs together, as and for the purpose specified.

ALFRED S. BOSMA.